United States Patent [19]
Keller

[11] 3,795,856
[45] Mar. 5, 1974

[54] METHOD AND APPARATUS FOR RECORDING SPIN RESONANCE SPECTRA USING A PULSE MODULATED RF EXCITATION SIGNAL

[75] Inventor: Toni Keller, Pallanden, Switzerland

[73] Assignee: Spectrospin A.G., Zurichfallanden, Switzerland

[22] Filed: May 19, 1972

[21] Appl. No.: 255,173

[30] Foreign Application Priority Data
May 28, 1971 Germany............................ 2126744

[52] U.S. Cl. ............ 324/.5 R, 324/.5 AC, 324/.5 A
[51] Int. Cl. .......................................... G01n 27/78
[58] Field of Search ............... 324/.5 A, .5 AC, .5 R

[56] References Cited
UNITED STATES PATENTS
3,147,428  9/1964  Anderson......................... 324/.5 AC
3,530,371  9/1970  Nelson et al. .................... 324/.5 AC

*Primary Examiner*—Robert J. Corcoran
*Attorney, Agent, or Firm*—Pennie & Edmonds

[57] ABSTRACT

A method and apparatus are described for performing time shared spin resonance analyses. A sideband of a pulse modulated RF signal is used to excite the spins of a sample, and the signals received from the excited spins are heterodyned with the carrier frequency of the pulse modulated RF signal. The heterodyned signal is detected by mixing it with a signal having a frequency equal to the product of the pulse repetition rate and the ordinal number of the sideband used to excite the spins. The frequency of the sideband used to excite the spins of the sample is swept through a range of frequencies simply by varying the pulse repetition rate. During such variations in the pulse repetition rate, the amplitude of the sideband signal is kept constant by varying the pulse duration or the amplitude of the carrier frequency signal. Apparatus for carrying out the method is described.

28 Claims, 4 Drawing Figures

3,795,856

METHOD AND APPARATUS FOR RECORDING SPIN RESONANCE SPECTRA USING A PULSE MODULATED RF EXCITATION SIGNAL

BACKGROUND OF THE INVENTION

In certain methods for recording spin resonance signals, the spins of a sample located in a magnetic field are excited periodically by a pulse modulated RF signal, signals from the excited spins are received in the intervals between the pulses, and the received signals are transformed by heterodyning to a lower frequency before being recorded. A spectrum of such signals may be recorded by sweeping the frequency of the spin-excitation pulses through a range of frequencies of interest. In the so-called time sharing method, the spin-excitation pulses have a repetition rate $f_x$ sufficiently high that the precession signal of the spins undergoes only negligible amplitude decay in the interval between consecutive pulses. Consequently, the only spins excited are those having a Larmor frequency equal to the carrier frequency $f_1$ or a sideband frequency $f_1 \pm nf_x$ of the RF signal. During each spin-excitation pulse, the receiving system is disconnected to prevent it from responding directly to the pulses. At the end of each spin-excitation pulse, the receiving system is enabled to receive the spin signals that are induced in a receiving coil by the excited spins.

To record a spin resonance spectrum, the carrier frequency of the pulse modulated RF signal must be both exceptionally stable and tuneable over the range of resonance frequencies being investigated in the sample. In general, these requirements cannot be fulfilled without great expense. Moreover, because of signal-to-noise problems and the need to produce either "absorption" mode or "dispersion" mode signals, it is preferable to use phase sensitive detection. For this purpose, the received spin signal is first mixed with a heterodyne frequency to form a lower frequency signal. This signal is then phase-selectively demodulated with a suitable auxiliary frequency. In prior systems, the generation of both the heterodyne and auxiliary frequencies required a considerable amount of circuitry.

The paper "NMR Double Irradiation Circuit" by R. C Hewitt in *Review of Scientific Instruments*, vol. 39, p. 1,066 (1968) describes an NMR spectrometer that alleviates some of these problems. However, Hewitt's spectrometer is still fairly complicated and produces spin-excitation pulses having a spectrum of limited application. Specifically, Hewitt forms the spin-excitation pulses by mixing a carrier signal with a pulse modulated modulating signal. This arrangement produces an intricate spectrum that limits the portion of the frequency spectrum that can be scanned by the spectrometer. In addition, the amplitude of the spectral components varies as the frequency of the spin-excitation pulses is changed, a feature that complicates the interpretation of the recorded spectrum.

SUMMARY OF THE INVENTION

In the present invention, a sideband $f_1 \pm nf_x$ of the pulse modulated RF signal is used to excite the spins of the sample and the signals received from the excited spins are heterodyned with the carrier frequency $f_1$ of the pulse modulated RF signal. In addition, the heterodyned signal is detected by mixing it with a signal having a frequency equal to the product of the pulse repetition rate and the ordinal number n of the sideband used to excite the spins.

The frequency of the sideband used to excite the spins of the sample is readily swept through the range of resonance frequencies being investigated by varying the pulse repetition rate. The range of frequencies is usually only about ten percent of the pulse repetition rate, facilitating such a variation. Where the range of frequencies is considerably greater, greater variations in the frequency of the spin-excitation sideband of the pulse modulated RF signal may be obtained by using higher order sidebands because any change in the pulse repetition rate $f_x$ is multiplied by the ordinal number of the sideband.

If only the pulse repetition rate were varied, the amplitude of the sideband signals would also change because the amplitude of each sideband is given by $$U_n = U_p\, t_B/T_x \cdot \sin(n\pi t_B/T_x)/n\pi t_B/T_x$$

where
$U_n$ = the amplitude of the sideband
$U_p$ = the amplitude of the carrier signal
$t_B$ = the pulse duration
$T_x$ = the pulse repetition period
$n$ = the ordinal number 0, 1, 2 ... of the sideband.

Such a variation in the amplitude of a sideband signal is undesirable because the amplitude of the signals received from the excited spins depends on the amplitude of the spin-excitation sideband signal. Accordingly, where the carrier signal amplitude $U_p$ is constant, it is desirable to maintain a constant ratio between the pulse duration and the pulse repetition period by adjusting the pulse duration to compensate for changes in the pulse repetition period. For low values of $(n \cdot t_B)/T_x$, the above expression for the sideband signal amplitude reduces to $U_n = (U_p \cdot t_B)/T_x$. For this case, it is possible to maintain a constant sideband amplitude by varying either the carrier signal amplitude or the pulse duration to compensate for changes in the pulse repetition period.

The method of the invention need not be limited to the recording of spin resonance spectra. It may be used to derive from an external or internal reference a control signal that maintains a constant magnetic field. In this application, a known spin is exposed to the magnetic field and is excited in the same way as the spins of the sample under investigation. The resonance frequency of this known spin is received and any deviations of this resonance frequency from its nominal value are used to readjust the magnetic field until the nominal value is obtained. If the known spin is received by the same receiving coil as that used to receive signals from the sample under investigation, it is called an internal reference; and if it is received by a separate receiving coil, it is called an external reference.

The present invention also includes a device for practicing the foregoing methods. This device is based on conventional spin resonance spectrometers having an RF oscillator that applies a carrier frequency signal to an RF modulator and a pulse generator that applies both modulation pulses to the RF modulator and control pulses to the spectrometer receiving system in the intervals between the modulation pulses. In the device of the present invention, pulses are formed by a voltage-frequency converter controlled by a variable voltage, such as a sawtooth voltage waveform, and a pulse generator that is connected to the output of the voltage-frequency converter. As a result, the pulse repetition rate may easily be varied in order to change the frequency of the sideband signal that is used to excite the spins.

In addition, the output of the voltage-frequency converter may be connected to a phase detector in the receiver for detection of the received signal. The voltage-frequency converter is therefore both the source of the pulse modulation that determines the sideband frequencies of the RF signal and the auxiliary source for phase sensitive detection of the resonance frequencies produced by the excited spins.

To maintain a constant sideband amplitude, a portion of the output signal of the RF modulator is applied through a rectifier and a low-pass filter to a voltage comparison stage that produces a difference voltage. This voltage controls a regulating signal that is applied to the pulse generator to determine the width of the modulation pulse produced by the generator. Thus, a constant ratio may be maintained between the pulse duration and the pulse repetition period. To change the length of the modulation pulse, the pulse generator may simply include a monostable multivibrator with a variable pulse duration.

Preferably, the oscillator supplying the carrier frequency of the pulse modulated RF signal is synchronized with a master oscillator that also synchronizes an oscillator in the apparatus for stabilizing the magnetic field. After appropriate frequency division, this master oscillator also supplies frequency signals that control a pulse generator and a phase detector in the magnetic field stabilizer. As a result, only one highly stable oscillator is required in the spectrometer and the structure of the spectrometer is relatively simple.

BRIEF DESCRIPTION OF THE DRAWING

These and other objects, features, and elements of the present invention will be more readily apparent from the following detailed description of the drawing in which.

DETAILED DESCRIPTION OF THE INVENTION

Figure 1:
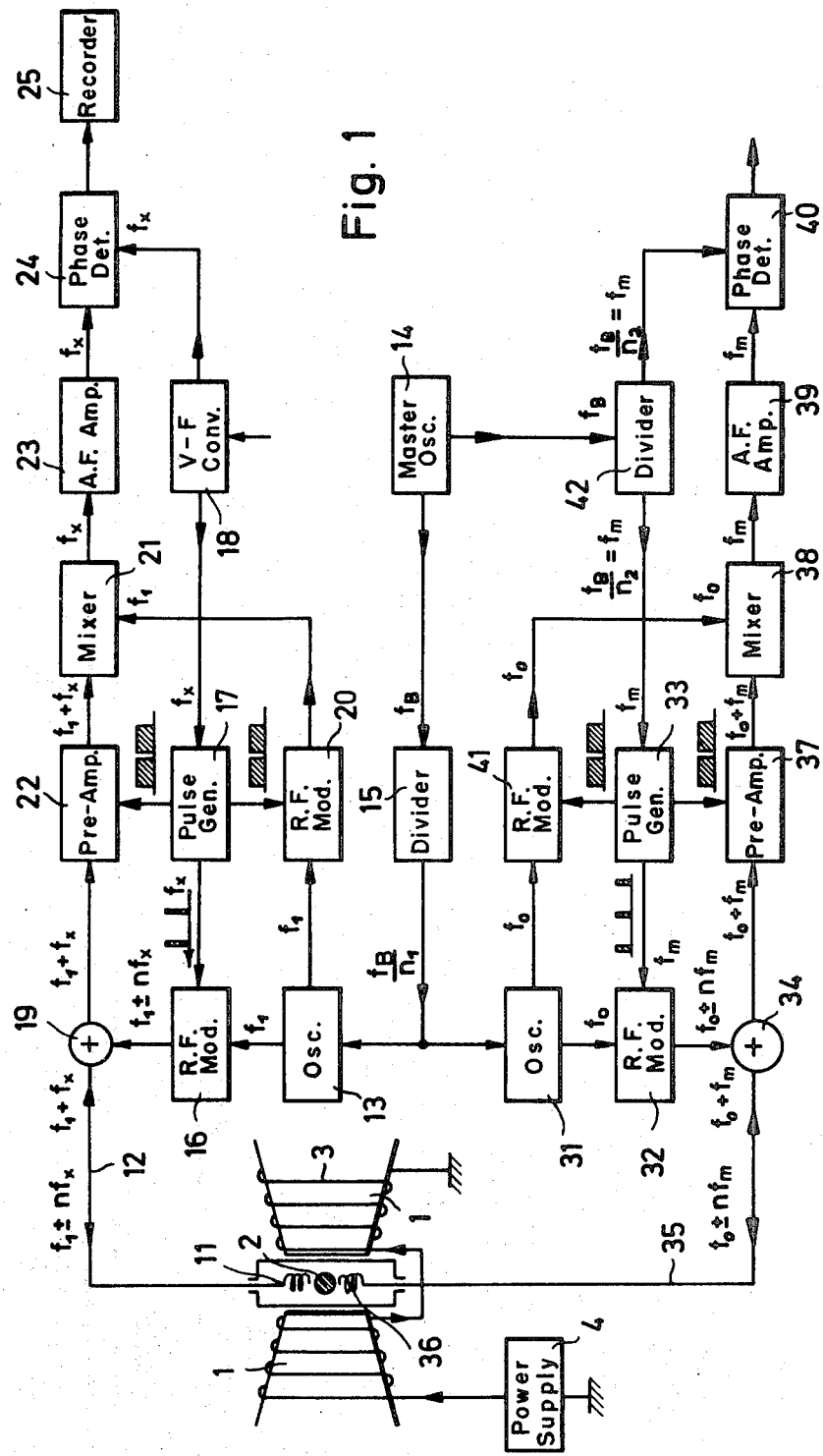
FIG. 1 is the block circuit diagram of a device according to the invention.

On the left-hand side of the spectrometer shown in FIG. 1 is a magnet 1 in the air gap of which is located a sample 2 being investigated for spin resonance. The magnetic field in the air gap is kept constant by a pair of coils 3 that are supplied with current from a power supply 4.

Spins within sample 2 are excited by a pulse modulated RF signal. The carrier frequency $f_1$ of this pulse modulated RF signal is generated by an oscillator 13. Oscillator 13 is connected to an RF modulator 16 to which a pulse generator 17 applies modulation pulses having a repetition rate $f_x$. The output of RF modulator 16 is a sequence of equally spaced pulses that are applied through a branch (or summing) point 19 on line 12 to a coil 11 to excite the spins within sample 2.

Oscillator 13 is synchronized by a master oscillator 14 having a highly stable output frequency $f_B$. This signal is applied to a divider 15 whose output is connected to the synchronized oscillator 13 so that the latter receives the synchronization frequency $f_B/n_1$. Pulse generator 17 is controlled by a signal having a repetition rate $f_x$ that is applied to it from a voltage-frequency converter 18. The input to $v$–$f$ 18 is typically a sawtooth voltage waveform.

Spins that are excited in sample 2 are received and detected in a preamplifier 22, a mixer 21, an AF (audio frequency) amplifier 23, a phase detector 24, and a recorder 25 connected in series. An output of pulse generator 17 is applied to preamplifier 22 to activate this receiving apparatus during the intervals between the pulses from RF modulator 16. At the same time, an output of pulse generator 17 is also applied to a second RF modulator 20 to pulse modulate a carrier frequency signal from oscillator 13. The pulse modulated RF signal from RF modulator 20 is applied to mixer 21 to heterodyne the signal from preamplifier 22. An output of voltage-frequency converter 18 is applied to phase detector 24 to detect the phase of the signal from AF amplifier 23.

The magnetic field is stabilized by a control signal derived from an external or internal reference in the magnetic field. The control signal is produced by exciting a known reference spin in the same way as the spins of the sample under investigation. The resonance frequency of this known spin is received and any deviations of this resonance frequency from its nominal value are used to produce a control signal that readjusts the magnetic field until the nominal value is obtained. The apparatus for exciting the reference spin and detecting its resonance frequency is substantially the same as that described above. The reference spin is excited by a pulse modulated RF signal having a carrier frequency $f_0$ that is generated by an oscillator 31. The output of oscillator 31 is connected to a third RF modulator 32 to which a pulse generator 33 applies modulation pulses having a repetition rate $f_m$. The output signal of RF modulator 32 is then applied through a branch (or summing) point 34 on line 35 to a coil 36 where it excites the reference spins. Illustratively, the reference spins are known spins in sample 2.

Oscillator 31 is also synchronized by master oscillator 14. Again, the output of oscillator 14 is applied to divider 15 and the output of this divider synchronizes oscillator 31. Pulse generator 33 is also controlled by master oscillator 14 via a divider 42. Thus, the control signal applied to pulse generator 33 has a pulse repetition rate $f_m = f_B/n_2$.

Spins that are excited in the reference in sample 2 are received and detected in a preamplifier 37, a mixer 38, an AF amplifier 39, and a phase detector 40 connected in series. An output of pulse generator 33 is applied to preamplifier 37 to activate this receiving apparatus during the intervals between the pulses from RF modulator 32. At the same time, an output of pulse generator 33 is also applied to a fourth RF modulator 41 to pulse modulate a carrier frequency signal from oscillator 31. The pulse modulated RF signal from RF modulator 41 is applied to mixer 38 to heterodyne the signal from preamplifier 37. In addition, an output of divider 42 is applied to phase detector 40 to detect the phase of the signal from AF amplifier 39. The output signal of phase detector 40 is applied to a field stabilizer to maintain a constant magnetic field in a known manner.

Figure 3:
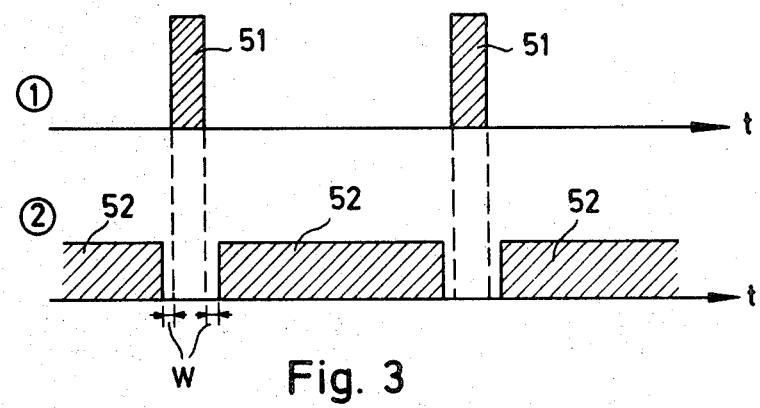
FIGS. 3 and 4 are diagrams explaining the mode of operation of the device according to FIG. 1.

As indicated above, the signals applied from pulse generators 17, 33 to RF modulators 16, 32 alternate with the signals applied to preamplifiers 22, 37. Preferably, as shown in FIG. 3, pulses 51 applied to RF modulators 16, 32 and pulses 52 applied to preamplifiers 22, 37 are separated by brief time intervals W to minimize disturbances arising from transients.

Figure 4:
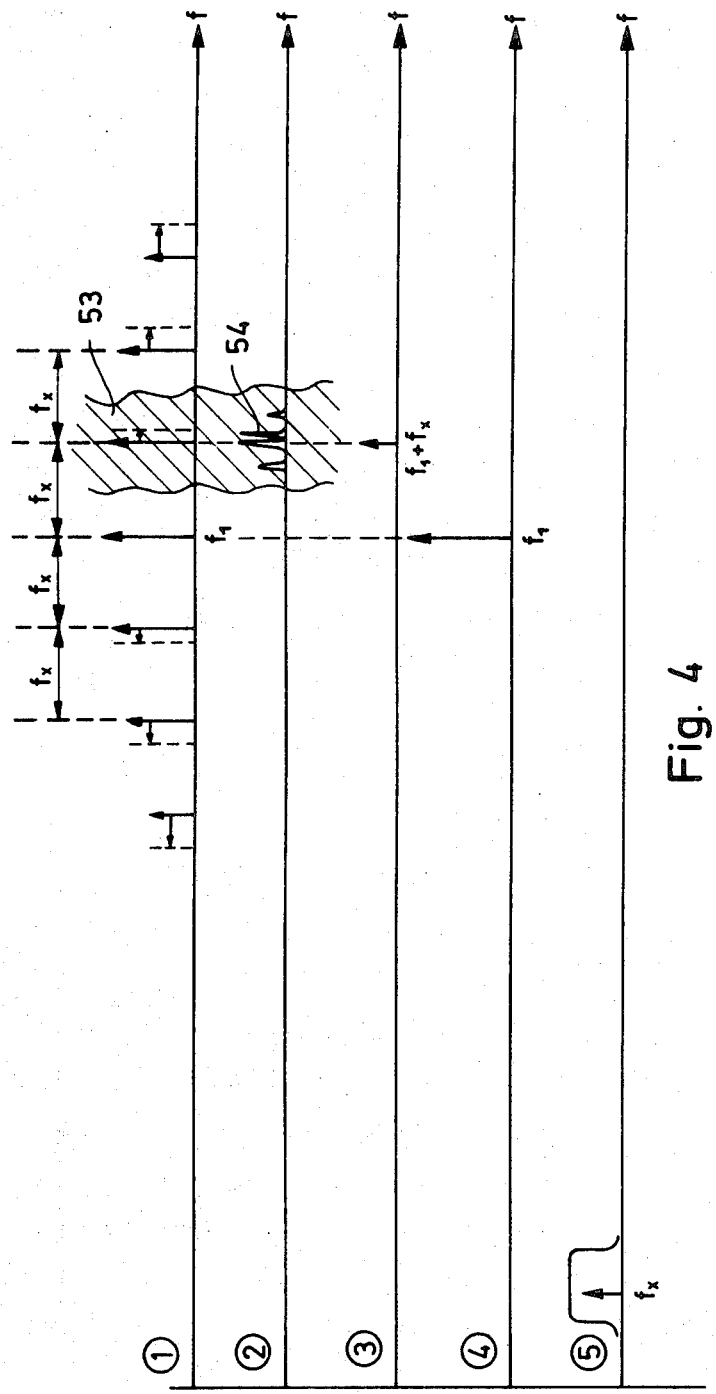

In practicing the invention, the carrier frequency $f_1$ from oscillator 13 may be selected, for example, so that the frequency $f_1 + f_x$ of the first upper sideband falls in the region of the resonance frequencies of the spins of the sample being investigated. This is illustrated in FIG. 4 where several equally spaced arrows on line 1 represent the spectral components of the output signal of RF modulator 16 and a shaded area 53 represents the frequency region in which may be found the resonance frequencies 54 of the spins of sample 2. As depicted in lines 2 and 3 of FIG. 4, the sideband frequency $f_1 + f_x$ excites a resonance frequency approximately equal to $f_1 + f_x$.

This resonance frequency is received by the spectrometer. By heterodyning the received resonance frequency signals with the carrier frequency $f_1$, a low frequency signal having the frequency $f_x$ (line 5 of FIG. 4) is obtained at the output of mixer 21. This signal falls within the pass band of AF amplifier 23. By heterodyning this signal with the signal supplied by voltage-frequency converter 18, a rectified signal is obtained at the output of phase detector 24. This signal may then be recorded by recorder 25.

By changing the pulse repetition rate, the distance $f_x$ between the side frequency and the carrier frequency $f_1$ may be shifted. Thus, by varying the signal applied to voltage-frequency converter 18, the pulse repetition rate may be varied to scan the sideband frequency $f_1 + f_x$ over the range 53 of resonance frequencies of the sample.

The apparatus that is used in this spectrometer to stabilize the magnetic field operates in a similar fashion. In this case, however, a variable pulse repetition rate is not required because the reference spin has a known resonance frequency. Thus, it is sufficient for the pulse repetition rate to be derived from master oscillator 14.

Figure 2:
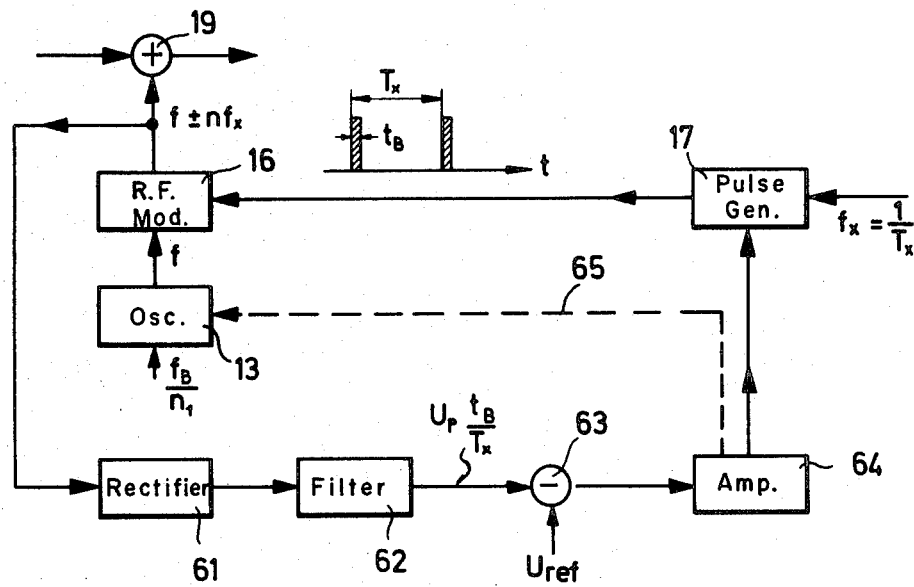
FIG. 2 is the block circuit diagram of a device for maintaining constant the ratio between the pulse duration and the pulse repetition period used in the device according to FIG. 1.

If the amplitude of the carrier signal and the pulse width were to remain constant, a variation of the pulse repetition rate $f_x$ would cause the amplitude of the sideband signals to change. This is undesirable because the amplitude of the received resonance frequencies depends on the amplitude of the excitation signal. Accordingly, apparatus shown in FIG. 2 is provided to maintain a constant sideband signal amplitude by adjusting the pulse duration or the carrier signal amplitude to compensate for changes in the pulse repetition period. Specifically, the output of RF modulator 16 is connected to a rectifier 61. The output of this rectifier has an average DC voltage of $(U_p \cdot t_B)/T_x$ where $U_p$ is the amplitude of the carrier signal, $t_B$ is the pulse duration, and $T_x$ is the pulse repetition period. This average DC voltage is applied to a low-pass filter 62 and is compared with a reference voltage $U_{ref}$ in a difference stage 63. A difference voltage at the output of stage 63 is applied to a regulating amplifier 64 that produces a signal controlling the duration of the modulation pulse generated by pulse generator 17. For example, pulse generator may include a monostable multivibrator that is triggered by a frequency supplied by the voltage-frequency converter and produces pulses having a duration controlled by the voltage received from regulating amplifier 64. The details of such a monostable multivibrator will be apparent to those skilled in the art.

Alternatively, as indicated in FIG. 2 by the broken line 65, for low values of $(n \cdot t_B)/T_x$ it is also possible to control oscillator 13 to maintain a constant ratio between the carrier signal amplitude and the pulse repetition period whenever the pulse duration is held constant. By thus controlling either the pulse duration or the carrier signal amplitude, a constant ratio may be maintained between the product of the carrier signal amplitude times the pulse duration and the pulse repetition period. Accordingly, a constant sideband amplitude may be maintained even when the pulse repetition period is varied.

It will be understood that the invention is not limited to the above described embodiments and that many variations are possible within the limits of the invention. Specifically, the invention lies in a method and apparatus for exciting and receiving spin resonance signals and this method and apparatus may be used either in recording spin resonances or in stabilizing the magnetic field or both. Accordingly, the invention may be practiced using either one of the spin recording apparatus or the magnetic field stabilizing apparatus without the other. As will be evident to those skilled in the art, numerous choices exist for generating the pulse modulated RF signal. For example, oscillators 13, 31 could themselves be highly stable oscillators and need not be synchronized by a master oscillator. Similarly, numerous devices exist for generating the modulation pulses that are applied to RF modulator 16.

What is claimed is:

1. A method for exciting and receiving spin resonance spectra, comprising:
   forming a pulse modulated RF signal having equally spaced pulses;
   exciting spins of a sample with a single sideband of the pulse modulated RF signal;
   heterodyning signals from the excited spins by mixing said signals with the carrier frequency of the pulse modulated RF signal; and
   detecting the heterodyned signals.

2. The method of claim 1 wherein the step of detecting the heterodyned signals comprises the step of mixing said signals with a signal having a frequency equal to the product of the pulse repetition rate of the pulse modulated RF signal and the ordinal number of the sideband used to excite the spins of the sample.

3. The method of claim 2 further comprising the step of varying the frequency of the sideband used to excite the spins of the sample by varying the pulse repetition rate of the pulse modulated RF signal.

4. The method of claim 3 further comprising the step of maintaining a constant sideband amplitude by varying at least one of the pulse duration and the carrier signal amplitude while the pulse repetition rate is varied.

5. The method of claim 1 further comprising the step of varying the frequency of the sideband used to excite the spins of the sample by varying the pulse repetition rate of the pulse modulated RF signal.

6. The method of claim 5 further comprising the step of maintaining a constant sideband amplitude by varying at least one of the pulse duration and the carrier signal amplitude while the pulse repetition rate is varied.

7. The method of claim 1 further comprising:
forming a second pulse modulated RF signal having equally spaced pulses;
exciting spins of an external or an internal reference sample by a sideband of the second pulse modulated RF signal;
heterodyning signals from the excited spins by mixing said signals with the carrier frequency of the second pulse modulated RF signal; and
forming from the heterodyned signal a signal for controlling a magnetic field in which the sample is located.

8. Apparatus for exciting and receiving spin resonance spectra, comprising:
means for forming a pulse modulated RF signal having equally spaced pulses;
means for exciting spins of a sample with a single sideband of the pulse modulated RF signal;
means for heterodyning signals from the excited spins by mixing said signals with the carrier frequency of the pulse modulated RF signal; and
means for detecting the heterodyned signals.

9. The apparatus of claim 8 wherein the means for forming a pulse modulated RF signal having equally spaced pulses comprises:
an oscillator;
an RF modulator connected to an output of the oscillator;
a voltage-frequency converter controlled by a variable voltage; and
a pulse generator controlled by an output of the voltage-frequency converter, said generator supplying equally spaced modulation pulses to the RF modulator at a pulse repetition rate controlled by said variable voltage.

10. The apparatus of claim 9 wherein the detecting means comprises a phase detector to which is applied an output of the voltage-frequency converter and the heterodyned signal.

11. The apparatus of claim 9 further comprising a rectifier connected to an output of the RF modulator and means for producing from an output of the rectifier a regulating signal that determines at least one of the width of the modulation pulses supplied by the pulse generator and the amplitude of the output of the oscillator.

12. The apparatus of claim 11 further comprising a low-pass filter, a voltage comparator, and a regulating amplifier connected in series to the rectifier.

13. The apparatus of claim 11 wherein the pulse generator contains a voltage controlled monostable multivibrator with a variable pulse duration.

14. The apparatus of claim 8 further comprising:
means for forming a second pulse modulated RF signal having equally spaced pulses;
means for exciting spins of an external or an internal reference sample by a sideband of the second pulse modulated RF signal;
means for heterodyning signals from the excited spins by mixing said signals with the carrier frequency of the second pulse modulated RF signal; and
means for forming from the heterodyned signal a signal for controlling a magnetic field in which the sample is located.

15. The apparatus of claim 14 further comprising a master oscillator that synchronizes both a first oscillator that supplies the carrier frequency of the first pulse modulated RF signal and a second oscillator that supplies the carrier frequency of the second pulse modulated RF signal.

16. The apparatus of claim 15 wherein the master oscillator supplies frequencies for controlling a pulse former and a phase detector in the apparatus for controlling the magnetic field.

17. The method of claim 1 further comprising the step of receiving signals from the excited spins only during intervals between pulses of the pulse modulated RF signal.

18. The apparatus of claim 8 further comprising means for receiving signals from the excited spins only during intervals between pulses of the pulse modulated RF signal.

19. The apparatus of claim 12 wherein the output of the regulating amplifier is applied to the pulse generator to control the duration of the modulation pulse produced by said generator.

20. The apparatus of claim 12 wherein the output of the regulating amplifier is applied to the oscillator to vary the amplitude of the output of the oscillator.

21. The apparatus of claim 13 wherein the duration of the pulse from the multivibrator is controlled by a voltage derived from the output of the rectifier.

22. A method for exciting and receiving spin resonance spectra, comprising:
forming a pulse modulated RF signal having equally spaced pulses;
exciting spins of a sample by a sideband of the pulse modulated RF signal;
heterodyning signals from the excited spins by mixing said signals with the carrier frequency of the pulse modulated RF signal;
detecting the heterodyned signals; and
varying the frequency of the sideband used to excite the spins of the sample by varying the pulse repetition rate of the pulse modulated RF signal.

23. The method of claim 22 further comprising the step of maintaining a constant sideband amplitude by varying at least one of the pulse duration and the carrier signal amplitude while the pulse repetition rate is varied.

24. The method of claim 22 wherein the step of forming the pulse modulated RF signal comprises the steps of:
forming a series of equally spaced pulses;
forming a carrier signal; and
modulating the carrier signal with the equally spaced pulses.

25. The method of claim 22 further comprising the step of receiving signals from the excited spins only during intervals between pulses of the pulse modulated RF signal.

26. Apparatus for exciting and receiving spin resonance spectra, comprising:
means for forming a pulse modulated RF signal having equally spaced pulses;
means for exciting spins of a sample by a sideband of the pulse modulated RF signal;
means for heterodyning signals from the excited spins by mixing said signals with the carrier frequency of the pulse modulated RF signal;
means for detecting the heterodyned signals; and means for varying the frequency of the sideband used to excite the spins of the sample by varying the pulse repetition rate of the pulse modulated RF signal.

27. The apparatus of claim 26 wherein the means for forming a pulse modulated RF signal having equally spaced pulses and the means for varying the frequency of the sideband comprise:

an oscillator;

an RF modulator connected to an output of the oscillator;

a voltage-frequency converter controlled by a variable voltage; and a pulse generator controlled by an output of the voltage-frequency converter, said generator supplying equally spaced modulation pulses to the RF modulator at a pulse repetition rate controlled by said variable voltage.

28. The apparatus of claim 23 further comprising a rectifier connected to an output of the RF modulator and means for producing from an output of the rectifier a regulating signal that determines at least one of the width of the modulation pulses supplied by the pulse generator and the amplitude of the output of the oscillator.

* * * * *